United States Patent [19]
Nakamura et al.

[11] Patent Number: 5,791,057
[45] Date of Patent: Aug. 11, 1998

[54] ELECTROMOTIVE CHAIN SAW

[75] Inventors: Kazuya Nakamura; Makoto Mizutani; Masaki Kondo, all of Anjo, Japan

[73] Assignee: Makita Corporation, Anjo, Japan

[21] Appl. No.: 704,492

[22] Filed: Aug. 20, 1996

[30] Foreign Application Priority Data

Sep. 4, 1995 [JP] Japan ................. 7-226484

[51] Int. Cl.⁶ .................................................. B27B 17/00
[52] U.S. Cl. ........................... 30/381; 30/382; 83/DIG. 1
[58] Field of Search ................. 30/382, 381; 83/DIG. 1

[56] References Cited

U.S. PATENT DOCUMENTS

| 3,604,868 | 9/1971 | Batcheller et al. ............ 200/67 G |
| 3,659,170 | 4/1972 | Burkett et al. ..................... 318/372 |
| 3,664,390 | 5/1972 | Mattsson et al. ................... 30/381 |
| 3,739,475 | 6/1973 | Moore .................................. 30/383 |
| 3,785,465 | 1/1974 | Johansson . |
| 3,793,727 | 2/1974 | Moore .................................. 30/383 |
| 3,857,180 | 12/1974 | Dooley ................................ 30/383 |
| 3,918,534 | 11/1975 | Fogelholm ..................... 192/106.1 |
| 3,922,785 | 12/1975 | Fushiya .............................. 30/391 |
| 3,923,126 | 12/1975 | Bidanset ......................... 30/381 X |
| 3,958,680 | 5/1976 | Armbruster et al. ......... 30/383 X |
| 3,982,616 | 9/1976 | Bidanset ............................ 192/104 C |
| 4,091,896 | 5/1978 | Wieland et al. ............... 30/382 X |
| 4,152,833 | 5/1979 | Phillips ............................... 30/382 |
| 4,226,312 | 10/1980 | Zindler ................................ 192/14 |
| 4,244,406 | 1/1981 | Stiepler ........................ 83/DIG. 1 |
| 4,367,813 | 1/1983 | Wieland et al. ................ 192/17 R |
| 4,370,810 | 2/1983 | Schurr et al. ....................... 30/382 |
| 4,432,139 | 2/1984 | Kohler et al. .................. 30/382 X |
| 4,543,723 | 10/1985 | Bortfeld et al. ..................... 30/381 |
| 4,573,556 | 3/1986 | Andreasson . |
| 4,625,406 | 12/1986 | Fushiya et al. . |
| 4,662,072 | 5/1987 | Wieland et al. .................... 30/382 |
| 4,680,862 | 7/1987 | Wieland et al. .................... 30/381 |
| 4,683,660 | 8/1987 | Schurr . |
| 4,751,414 | 6/1988 | Davis et al. ......................... 310/93 |
| 4,753,012 | 6/1988 | Schurr ................................. 30/382 |
| 4,757,881 | 7/1988 | Jonsson et al. ................ 30/382 X |
| 4,782,593 | 11/1988 | Kieser et al. . |
| 4,793,064 | 12/1988 | Nagashima ......................... 30/382 |
| 4,811,487 | 3/1989 | Takahashi et al. ................. 30/382 |
| 4,882,844 | 11/1989 | Stokan ................................. 30/381 |
| 4,962,588 | 10/1990 | Fushiya et al. ................ 30/393 X |
| 5,005,295 | 4/1991 | Fushiya ........................... 30/391 X |
| 5,101,567 | 4/1992 | Cool ..................................... 30/382 |
| 5,243,764 | 9/1993 | Wieland ......................... 30/381 X |
| 5,272,813 | 12/1993 | Wolf et al. ..................... 30/381 X |
| 5,294,874 | 3/1994 | Hessenberger et al. ......... 318/759 |
| 5,480,009 | 1/1996 | Wieland et al. ............... 30/382 X |

FOREIGN PATENT DOCUMENTS

| 0743 147 | 11/1996 | European Pat. Off. . |
| 3510471 | 9/1985 | Germany . |
| 3639650 | 6/1988 | Germany . |
| 9212059.8 | 2/1994 | Germany . |
| 4330850 | 3/1995 | Germany . |
| 195-42-603 | 5/1996 | Germany . |
| 196-14-212 | 10/1996 | Germany . |
| 657401 | of 0000 | Japan . |
| 7-194185 | 7/1995 | Japan . |

Primary Examiner—M. Rachoba
Attorney, Agent, or Firm—Davis and Bujold

[57] ABSTRACT

The chain of an electromotive chain saw is quickly stopped by the combined use of an electric brake and a mechanical brake when a trigger member is turned off. The rear end of a brake band disposed to tighten a brake drum by operating a hand guard is secured to a bent rod. When the trigger member is released, the brake band is normally tightened around the outer periphery of a brake drum by the urging force of a coil spring. When the trigger member is released, a circuit provided with a brake winding is closed, thereby applying a dynamic braking force. When the dynamic brake force is applied, a centrifugal clutch is released quickly and the speed of stopping the brake drum is accelerated.

14 Claims, 13 Drawing Sheets

FIG. 10A
FIG. 10B
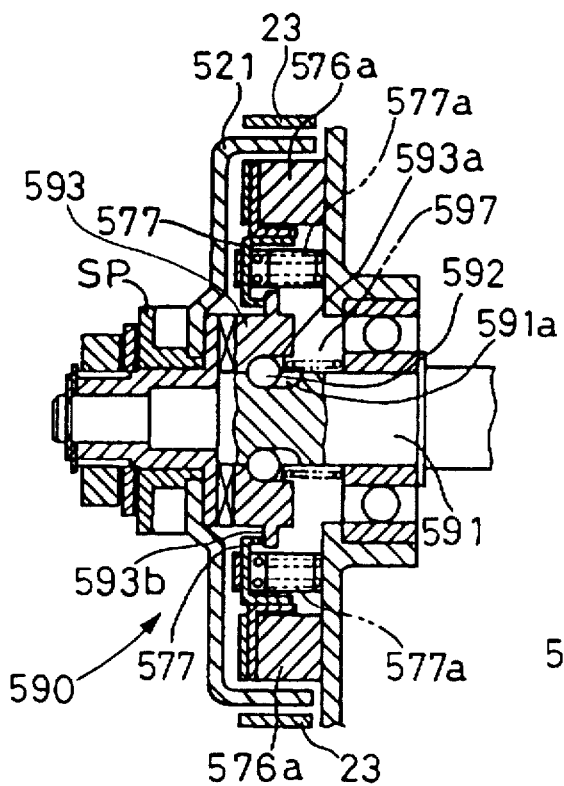
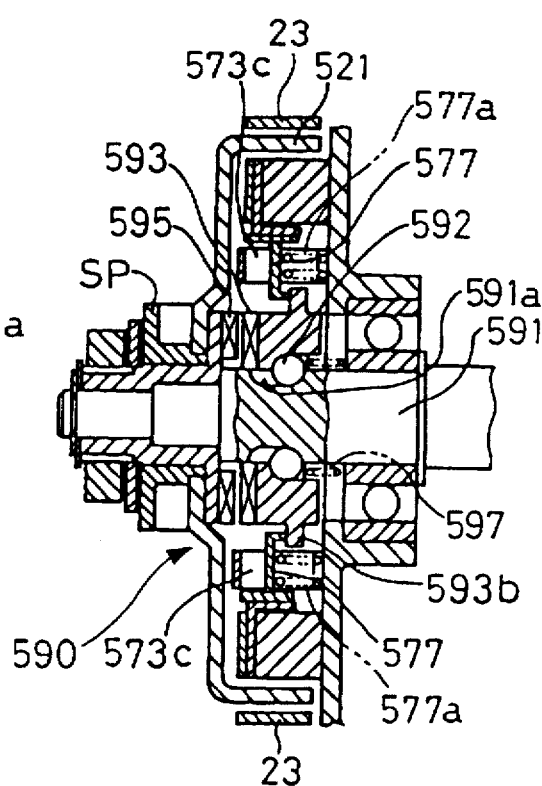
FIG. 10C
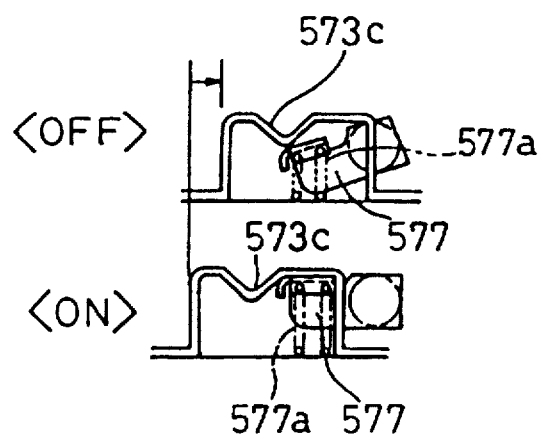

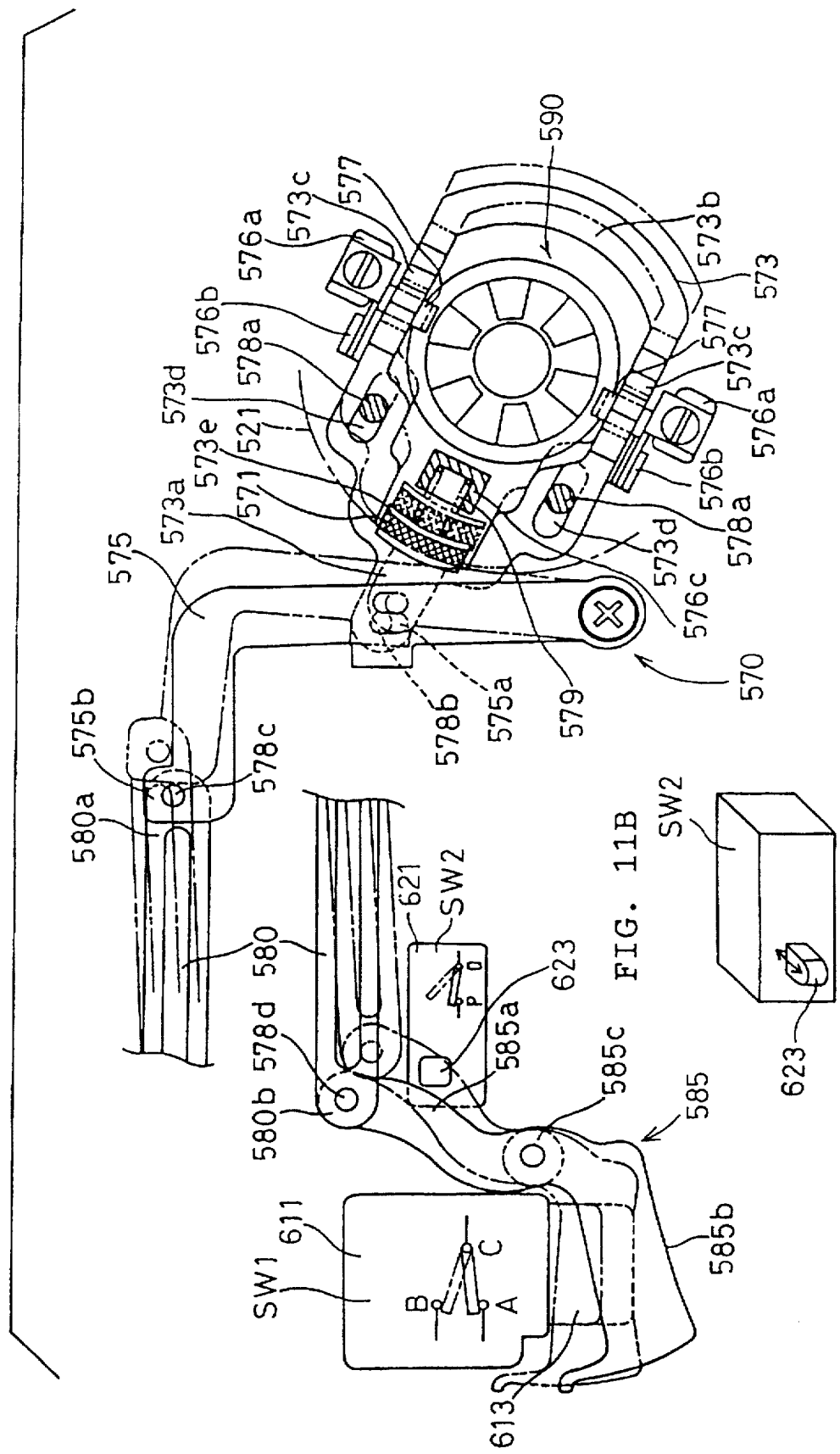

ELECTROMOTIVE CHAIN SAW

FIELD OF THE INVENTION

This invention relates to an electromotive chain saw.

BACKGROUND OF THE INVENTION

In a conventional electromotive chain saw, a hand guard for protecting an operator's hands is provided in front of a handle. Additionally, a brake band is wound around a brake drum for stopping the operation of a cutting chain. By operating the hand guard and pulling one end of the brake band, the brake drum is tightened with the brake band, thereby stopping the cutting chain.

However, in such electromotive chain saws, even after a trigger member is released and a motor drive switch is turned off, the inertial rotation of the motor often results in the rotation of the cutting chain for several seconds. If the rotating chain contacts or hits the ground, it is often damaged, thereby requiring the replacement of the chain itself. The material in process is also inadvertently damaged. Furthermore, the operator cannot go to the subsequent steps of work until the chain is completely stopped. Thus, the work efficiency is deteriorated.

To solve the aforementioned problem, it is proposed in Japanese examined and published patent application No. 657401 that a circuit having a brake winding is provided in an electromotive motor and the circuit is closed when a trigger member is released, for the purpose of dynamic braking without any impact.

Such gradual stopping of the chain achieved in the proposal fails to satisfy a recent demand for stopping the chain quickly, for example, within one second after the trigger member is released.

SUMMARY OF THE INVENTION

Wherefore, an object of the present invention is to provide a brake device for a chain saw that can quickly stop the rotation of a cutting chain when a trigger member is released.

To achieve this or other object, the present invention provides an electromotive chain saw, having an electric motor for providing a rotary drive force to a drive sprocket on which a cutting chain is wound, a trigger member for energizing the electric motor when turned on and for stopping the electric motor when turned off, a trigger link mechanical brake for being engaged with a brake drum secured to the drive sprocket when the trigger member is turned off and for being disengaged from the brake drum when the trigger member is turned on, and a trigger link brake circuit for cooperating with the trigger member and applying a dynamic braking force to the electric motor when the trigger member is turned off.

In operation of the electromotive chain saw, when the trigger member is turned off, both the trigger link mechanical brake and the trigger link brake circuit are operated. The mechanical braking of the brake drum and the electric braking of the electric motor are concurrently carried out. As a result, the cutting chain is stopped directly stopped by the trigger link mechanical brake and indirectly by the trigger link brake circuit, more quickly as compared with the provision of only the trigger link brake circuit or only the trigger link mechanical brake.

The number of rotations of the electric motor can be quickly decreased, in the electromotive chain saw in which the rotary drive force is transmitted from the electric motor via a centrifugal clutch mechanism to the drive sprocket. This occurs, when a predetermined number of rotations of the electric motor is reached or exceeded and no rotary drive force is transmitted to the drive sprocket when the number of rotations is lower than the predetermined number of rotations. Since the centrifugal clutch is quickly released, the load on the trigger link mechanical brake can be reduced. Therefore, the cutting chain can be instantly stopped and the trigger link mechanical brake results in increased durability.

Instead of the centrifugal clutch mechanism, the clutch mechanism can be composed of a plurality of engagement teeth formed on the brake drum, an engagement member rotated together with a rotation shaft rotated by the electric motor and slidable in an axial direction relative to the rotation shaft for engaging with the engagement teeth on the brake drum, and an urging member for pushing and urging the engagement member toward the brake drum. The electromotive chain saw is further provided with a clutch release member for releasing the engagement of the clutch mechanism by pushing back the engagement member against the urging member when the trigger member is moved from its ON position to its OFF position.

In the conventional electromotive chain saw having the clutch release member, the cutting chain can be instantly stopped with a mechanical brake force when the trigger member is turned off. This occurs while gradually stopping the inertial rotation of the electric motor. In the present invention, the cutting chain and the electric motor are concurrently stopped, thereby eliminating discomfort given to an operator when the electric motor is inertially rotated even after the cutting chain is stopped.

In addition, a further advantage of the present invention is provided by the provision of the aforementioned dynamic braking. In actual operation of the conventional electromotive chain saw, when the released trigger member is turned on immediately after turning off, if the motor is still inertial rotated, the rotating clutch components are going to be engaged with one another and the rotary drive force of the electric motor is applied to an engagement detent and other components, thereby impairing the durability of the clutch mechanism. However, in the present invention, the electric motor is also stopped by the dynamic braking. Therefore, the durability of the engagement detent and other clutch components is enhanced.

In the electromotive chain saw, a conventional brake band can be wound around the brake drum, and a trigger link mechanical brake can be provided. By operating a hand guard and pulling the connected end of the brake band, the brake drum is tightened with the brake band, thereby stopping the cutting chain against the rotary drive force of the electric motor. Also, by releasing the trigger member, the cutting chain is stopped directly by the trigger link mechanical brake and indirectly by the trigger link brake circuit.

The trigger link mechanical brake of the electromotive chain saw is provided with an operable member secured to an end of the brake band, for cooperating with the trigger member, such that the brake band is pulled and tightened when the trigger member is released and the brake band is released or loosened when the trigger member is turned on.

An operable member is provided which is secured to one end of the brake band having the other end operatively connected to the hand guard, for cooperating with the trigger member. This adds only a slight structural change to the conventional structure and requires no complicated mechanical arrangement. When the trigger member is released, the end of the brake band, opposite the end operatively connected with the hand guard, is pulled, thereby tightening the brake band for stopping the cutting chain. Therefore, when braking by the trigger link mechanical brake is employed a frictional force is applied to the opposed part of the brake band resulting in a frictional force at the time of braking by the operation of the hand guard.

The trigger link mechanical brake can be provided with a brake shoe for engaging with the outer periphery of the brake drum, an urging member for normally urging or pressing the brake shoe to the brake drum, and a pulling member for disconnecting the brake shoe from the brake drum against the urging member when the trigger member is depressed or turned on.

The brake shoe is provided separately from the brake band and is operatively connected to the hand guard. When the trigger member is released, the brake shoe applies a braking force without giving any frictional force to the brake band.

Alternatively, the trigger link mechanical brake can be provided with a brake shoe operatively connected to the trigger member for engaging with the inner periphery of the brake drum. When the trigger member is released, the brake shoe is pushed onto the brake drum, and when the trigger member is turned on, the brake shoe is disconnected from the brake drum.

The trigger link brake circuit of the electromotive chain saw is provided with a main winding and a brake winding both in a field slot. The supply of a drive current to an armature and the main winding and the supply of a counter electromotive force arising with the brake winding to the armature are changed over with a single-pole double-throw switch, thereby driving and braking the electric motor. When the single-pole double-throw switch is changed over such that the drive current is supplied to the armature and the main winding, one end of the brake winding is disconnected from the armature via the single-pole double-throw switch, and the other end of the brake winding is disconnected from the main winding via a single pole switch.

During the operation of the electromotive chain saw, in the trigger link brake circuit, the brake winding is disconnected from the main winding by the single pole switch, and the brake winding is disconnected from the armature by the single-pole double-throw switch. Therefore, even when the main winding and the brake winding are wound in the same field slot, the brake winding and the main winding are completely insulated via the single pole switch and thus will not deteriorate and no field layer shortage thus occurs. Therefore, to provide the sufficient capabilities of the brake winding, the number of windings can be increased. The trigger link brake circuit is highly durable while it also fulfills its braking performance. For this purpose, the inexpensive single pole switch is provided, eliminating the need for a two-pole double-throw switch, which is cost effective.

To operate the electromotive chain saw, in the trigger link brake circuit, the single pole switch is switched over such that the brake winding is disconnected from the armature and the main winding. The clutch mechanism is engaged. Subsequently, the single-pole double-throw switch is changed over such that the power source is connected with the armature and the main winding.

To apply a braking force to the electromotive chain saw, the single-pole double-throw switch is changed over such that the power source is disconnected from the armature an the main winding and the brake winding is connected with the armature. The clutch mechanism is disconnected. Subsequently, the single pole switch is changed over such that the brake winding is connected with the armature.

When the electric motor is in operation and the single-pole double-throw switch is turned on, in the switching approach, no connection is made between the brake winding and the main winding, therefore, no field layer shortage arises.

Furthermore, when the chain saw is in operation, after the clutch mechanism is engaged, the single-pole double-throw switch is changed over to connect the power source with the main winding and the armature, and the electric motor is driven. When the chain saw is braked, after the single-pole double-throw switch is changed over to disconnect the power source from the main winding and the armature, the clutch mechanism is disengaged. The engagement and disengagement of the clutch mechanism can thus be easily carried out and the durability of the engagement detent can be enhanced.

BRIEF DESCRIPTION OF THE DRAWINGS

The invention will now be described, by way of example, with reference to the drawings, in which:

FIG. 10A is a cross-sectional view showing the clutch engagement, FIG. 10B is a cross-sectional view showing the clutch disengagement and FIG. 10C is an explanatory view showing the movement of a swingable detent when the clutch is engaged or disengaged, of the chain saw according to the third embodiment;

FIG. 11A is an explanatory view of the interconnection of the clutch and the brake device in the chain saw of the third embodiment; and FIG. 11B is a perspective view of a single pole switch;

DETAILED DESCRIPTION OF THE PREFERRED EMBODIMENTS

Figure 1:
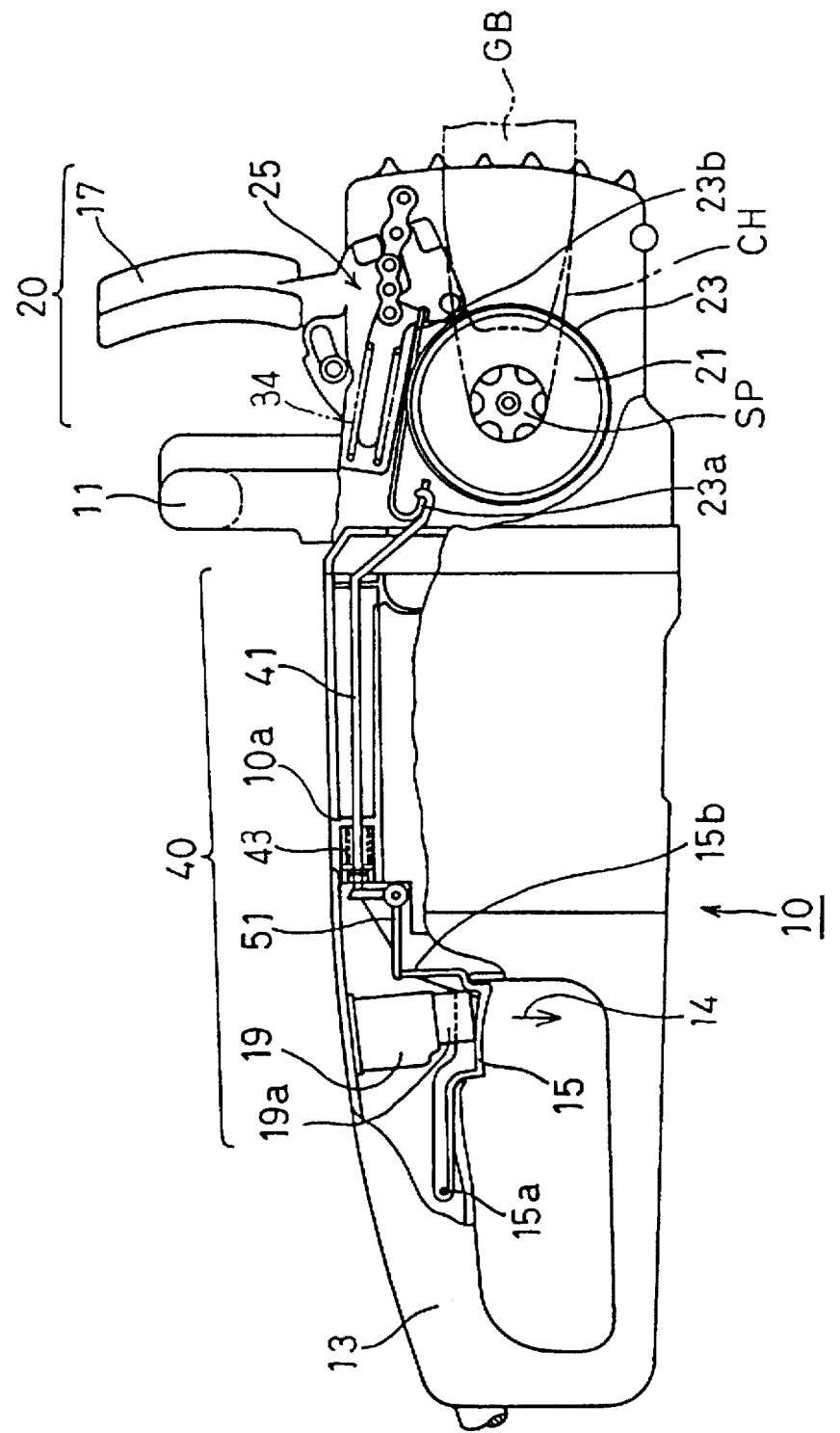
FIG. 1 is a partly broken front view of an electromotive chain saw according to a first embodiment of the invention.
Figure 8:
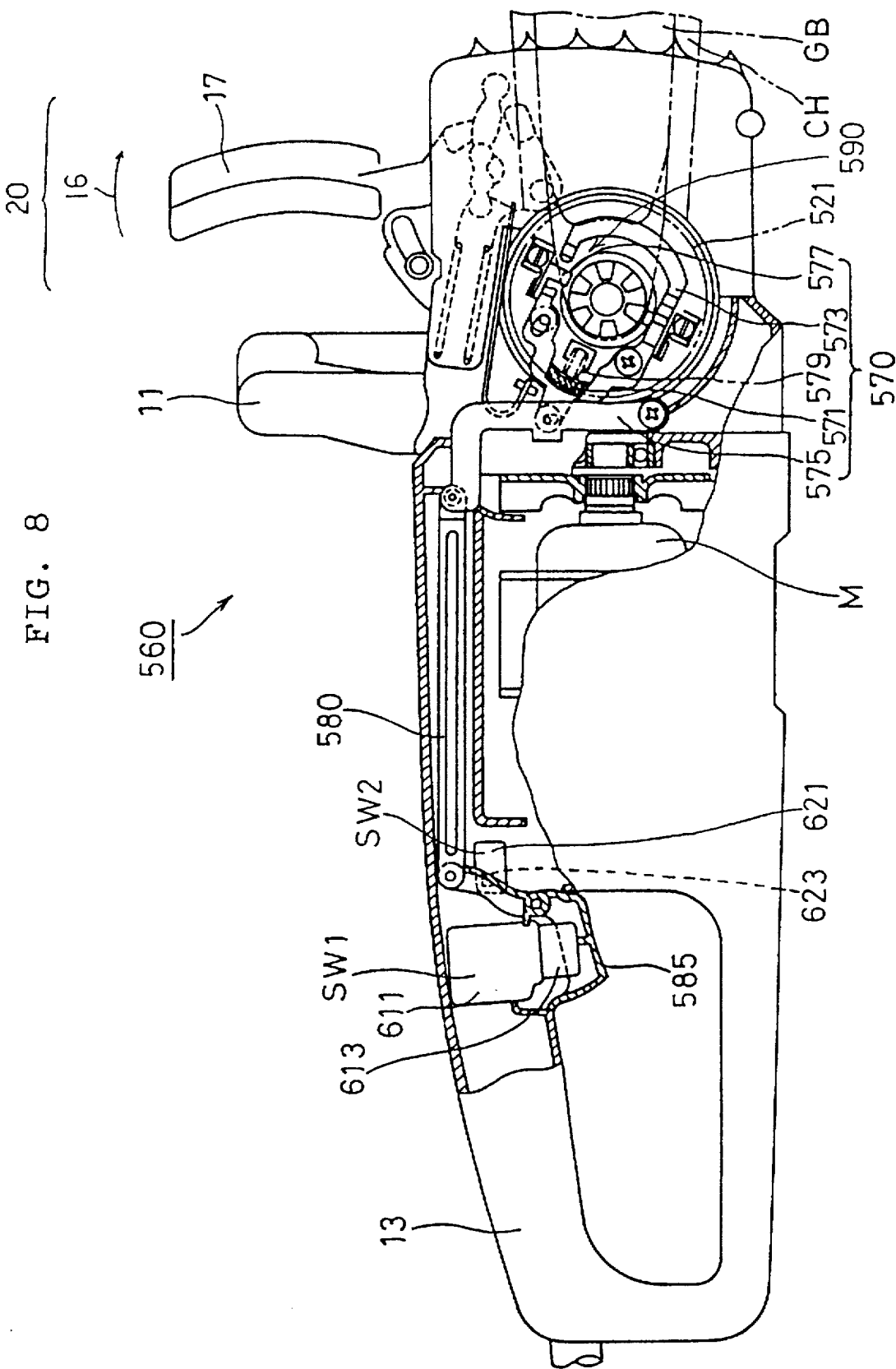
FIG. 8 is a partly broken front view of a chain saw according to a third embodiment of the invention.
Figure 9:
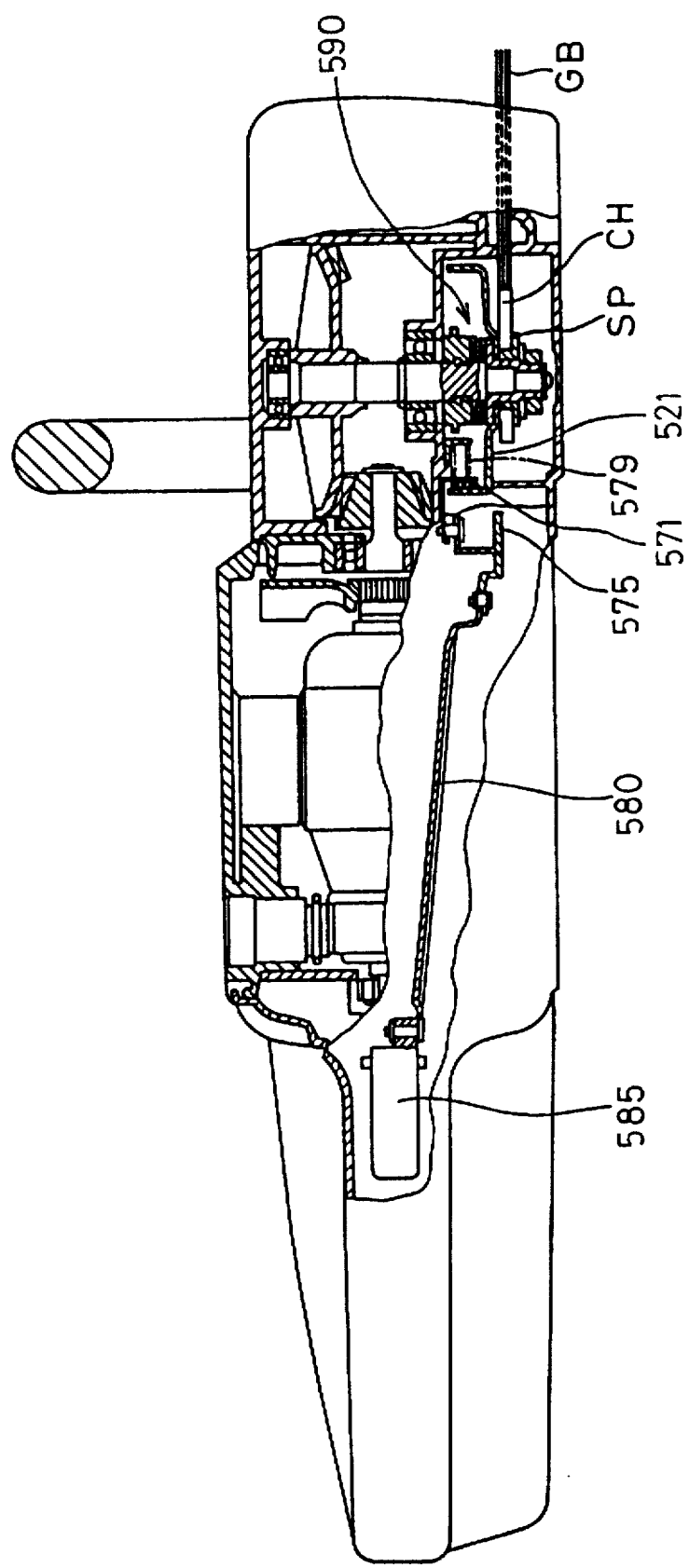
FIG. 9 is a partly broken plan view of the chain saw according to the third embodiment of the invention.

As shown in FIG. 1, in an electromotive chain saw 10 of the first embodiment, a chain CH is wound around a guide bar GB extending from a housing and is driven with an electric motor M (as shown in FIG. 8) and a not-shown centrifugal clutch built into the housing. The electromotive chain saw 10 is manually held with a forward handle 11 and a rearward handle 13. The grip of the rearward handle 13 is provided with a movable trigger lever 15. A hand guard 17 is disposed in front of the forward handle 11, with a hand guard brake device 20 built therein, which is operated by turning the hand guard 17 in the direction shown by arrow 16 in FIG. 3. The trigger lever 15 is normally urged, by a spring having a switch built therein, in the direction shown by an arrow 14 in FIG. 1, and is brought in contact with a push button 19a of a power switch 19 of the electric motor when depressed.

Figure 3:
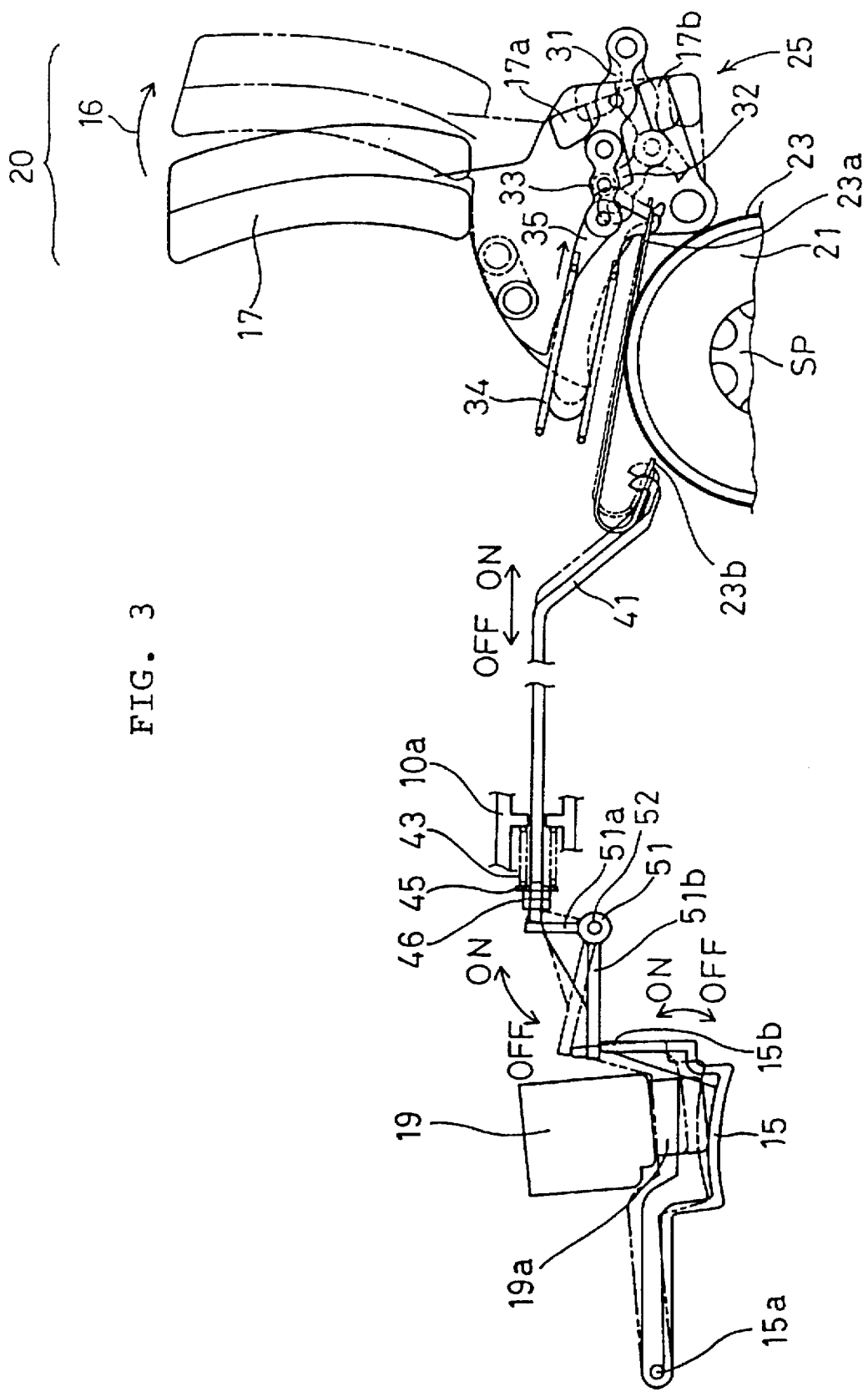
FIG. 3 is an enlarged view of a mechanical brake device interconnected with a hand guard of the chain saw of the first embodiment.

As shown in FIG. 3, the hand guard the brake device 20 applied in cooperation with the hand guard 17 is formed with a steel brake band 23 wound around a brake drum 21, also serving as a centrifugal clutch drum, securely attached onto a sprocket SP. The hand guard brake device 20 is also provided with a linkage 25 for connecting a forward end 23a of brake band 23 to the hand guard 17. The linkage 25 is formed with a forward end link plate 31 interposed between engagement projections 17a, 17b of hand guard 17. The forward end link plate 31 is interconnected with a middle link plate 33 by a rearward jaw 32. The middle link plate 33 is further interconnected with a rear end link plate 35 which is urged forwards by a coil spring 34.

When the hand guard 17 is in an initial position as shown by a solid line in FIG. 3, the link plates 31, 33, 35 are aligned, thereby pushing against the coil spring 34, loosening the brake band 23 and permitting the brake drum 21 to rotate. When the hand guard 17 is rotated in the direction shown by the arrow 16 in FIG. 3, the projection 17a of hand guard 17 lowers downward the forward end link plate 31, as shown by a two-dotted line. As a result, the middle link plate 33 is disengaged from the rearward jaw 32 and is rotated, thereby pulling the rear end link plate 35 forwards. The coil spring 34 is thus immediately extended, thereby quickly tightening the brake band 23. The brake drum 21 is forced to stop and the chain CH is also stopped.

Figure 2:
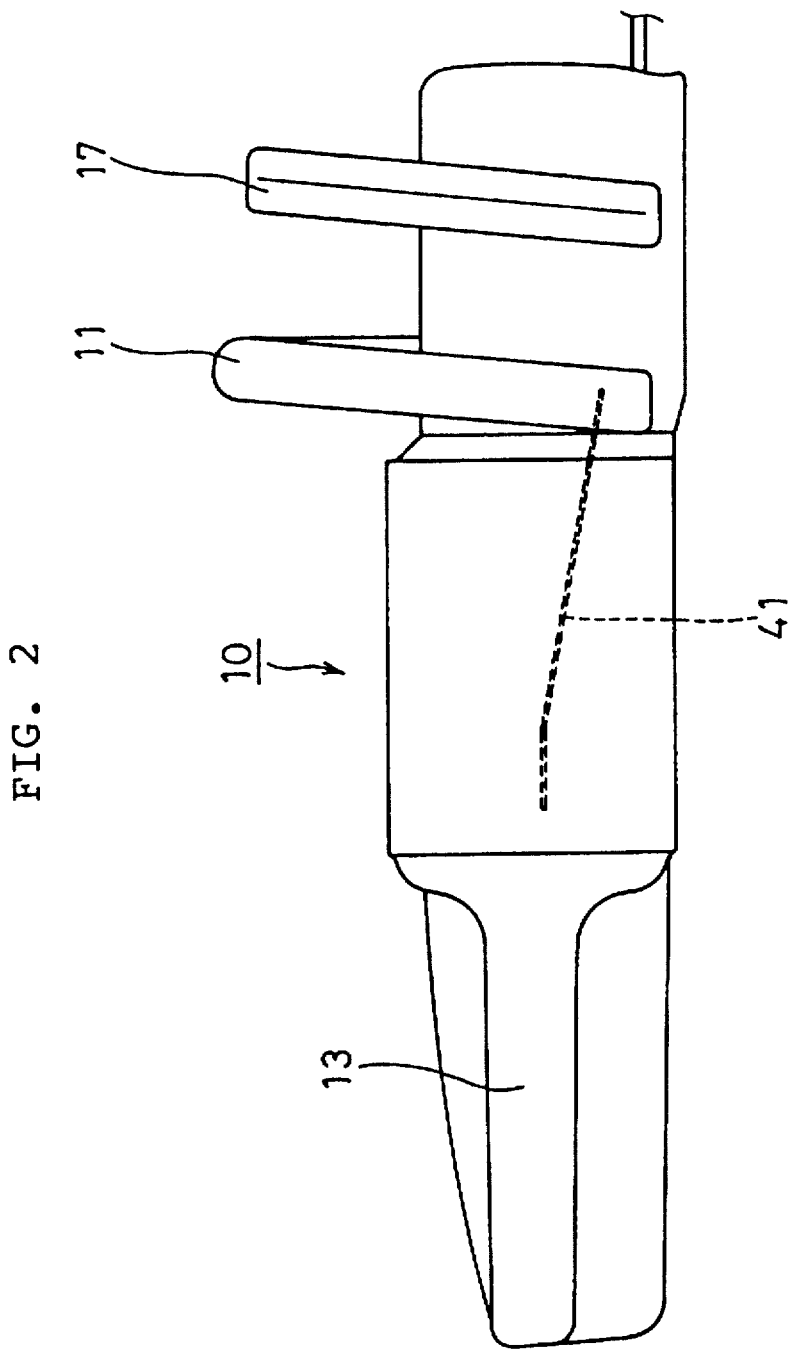
FIG. 2 is a plan view of the chain saw of the first embodiment.

As shown in FIGS. 1, 2 and 3, a rear end 23b of brake band 23 is fixedly hooked on a bent rod 41, such that a mechanical brake device 40 is formed for being operated with the power switch 19 when the trigger lever 15 is released. The bent rod 41 is reciprocatably supported in a body case 10a. The rear end of bent rod 41 is secured to the rear end of coil spring 43 via a washer 45 and a double nut 46. The forward end of coil spring 43 is secured to part of the body case 10a. The bent rod 41 is thus urged rearwardly by the coil spring 43.

The rear end of the bent rod 41 is engaged with an upwardly extending lever 51a of a movable member 51 rotatable about a rotational center 52. The movable member 51 is engaged with the forward end of the trigger lever 15 by its rearward lever 51b extending perpendicularly from the upwardly extending lever 51a. The trigger lever 15 is rotatably supported on a support 15a, and a forward end 15b, remote from the support 15a and is largely moved by turning on or off the power switch 19.

In operation, when the power switch 19 is turned off, as shown by the solid line in FIG. 3, the movable member 51 of the brake device 40 is moved in a counterclockwise direction as seen in the figure by means of the force of the coil spring 43, thereby pulling the bent rod 41 rearwardly. Therefore, the brake band 23 is pulled or tightened, thereby applying a braking force onto the brake drum 21.

When the trigger lever 15 is depressed and the power switch 19 is turned on, as shown by a two-dotted line in FIG. 3, the movable member 51 is pushed in a clockwise direction as seen in the figure. The rear end of the bent rod 41 is thus pushed forwards. The compression of coil spring 43 permits the bent rod 41 to slide forwards. Accordingly, the brake band 23 is loosened, aided by the restoring force of its steel construction.

Figure 4:
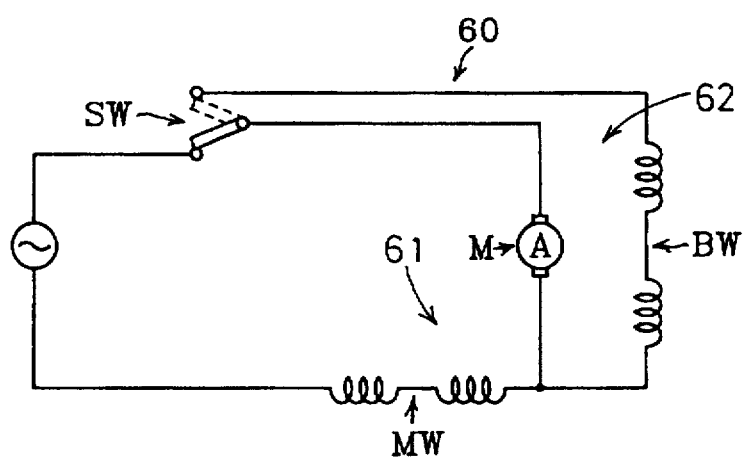
FIG. 4 is a circuit diagram of an electric brake device of the chain saw.

The chain saw 10 is provided with an electric drive and brake device 60 as shown in FIG. 4. The electric drive and brake device 60 is composed of a drive circuit 61 for supplying a drive current to a main winding MW and an armature by a single-pole double-throw switch SW when the trigger lever 15 is turned on and of a brake circuit 62 for supplying a counter electromotive force arising on a brake winding BW to the armature by the single-pole double-throw switch SW when the trigger lever 15 is released.

In the first embodiment, when the trigger lever 15 is released, the aforementioned mechanical brake device 40 and the electric drive and brake device 60 for dynamic braking shown in FIG. 4 are operated concurrently. While a braking force is mechanically applied to the brake drum 21, the inertial rotary force of the electric motor is diminished by the dynamic braking, quickly decreasing the number of rotations of the electric motor and releasing the centrifugal clutch. Since the centrifugal clutch is disconnected, no inertial force of the electric motor is transmitted, thereby contributing to the mechanical stop of brake drum 21. Therefore, when the trigger lever 15 is released, no rotary drive force is transmitted to the brake drum 21. When the brake band 23 is tightened around the stopped brake drum 21, only the inertial rotary force of the chain CH is loaded on the brake band 23. The chain CH can be quickly stopped and the durability of brake drum 21, brake band 23 and chain CH can be enhanced.

The hand guard brake device 20 cooperates with the hand guard 17 and the rear end 23b of the brake band 23 is operatively connected via the bent rod 41 with the mechanical brake device 40. Such brake mechanism is achieved with a minimum number of components and such a simple mechanical structure.

The mechanical brake device 40 cooperates with the power switch 19 and exerts a braking or tightening force to the brake band 23 in the direction opposite to the force exerted to the brake band 23 by the operation of hand guard 17. When the hand guard brake device 20 is operated, the frictional faces of brake band 23 and brake drum 21 are deviated from those when the mechanical brake device 40 is operated. The frictional face of brake band 23 is prevented from being worn quickly by the operation of the hand guard 17 for braking.

Furthermore, as shown in FIGS. 1 and 2, the mechanical brake device 40 is formed in a clearance in the vicinity of side walls of the body case 10a using the bent rod 41, without increasing the size of the chain saw 10.

A second embodiment is now explained. The second embodiment is the same as the first embodiment in that the brake circuit 62 for dynamic braking as shown in FIG. 4, the hand guard brake device 20 operatively connected to the hand guard 17, and the centrifugal clutch are provided. The components having the same reference numerals as those of the components of the first embodiment are not explained hereinafter. only the aspect of the second embodiment different from the first embodiment, the structure of the mechanical brake device operated when the trigger lever is let off, is explained.

Figure 5:
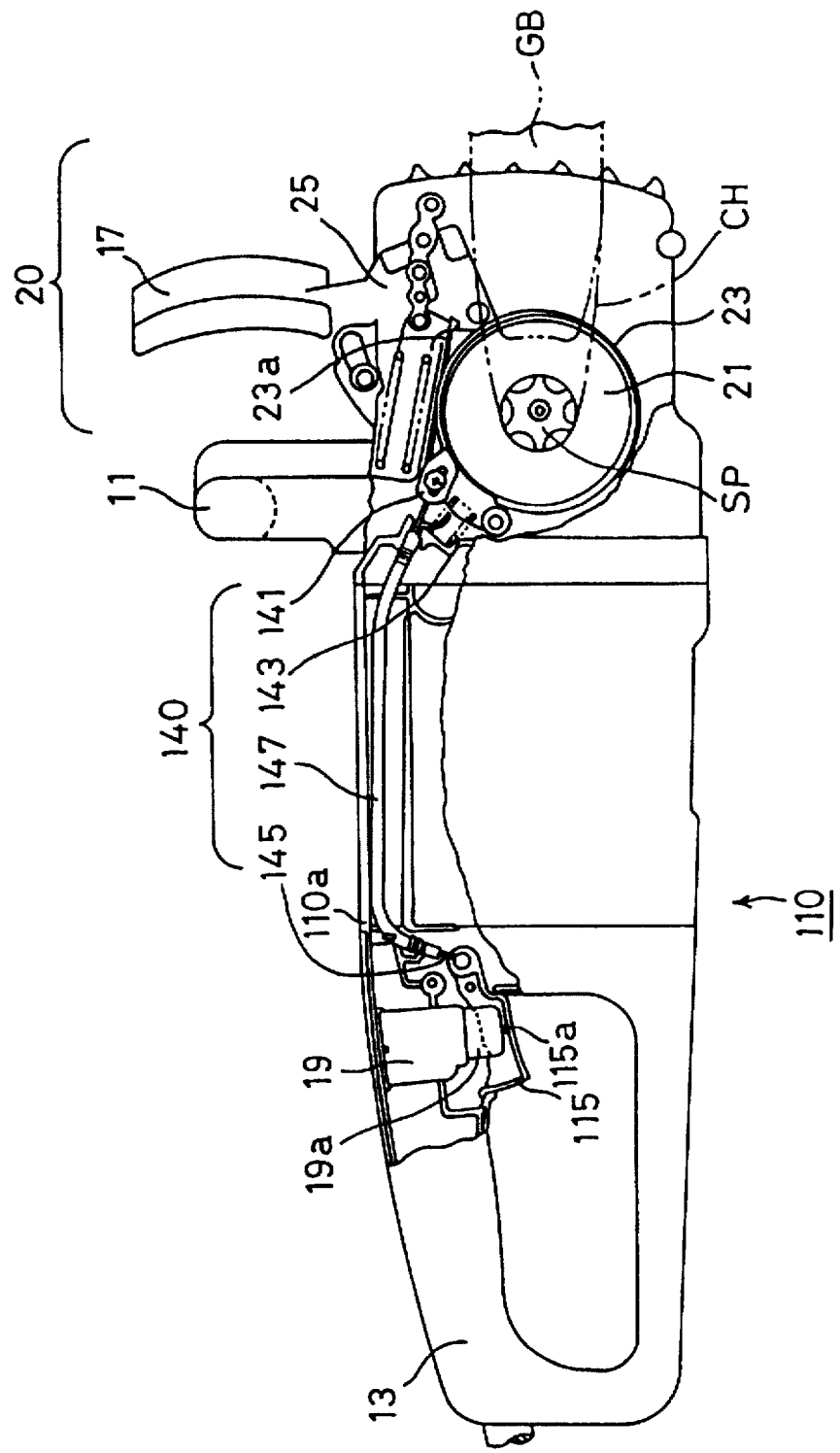
FIG. 5 is a partly broken front view of a chain saw according to a second embodiment of the invention.
Figure 6:
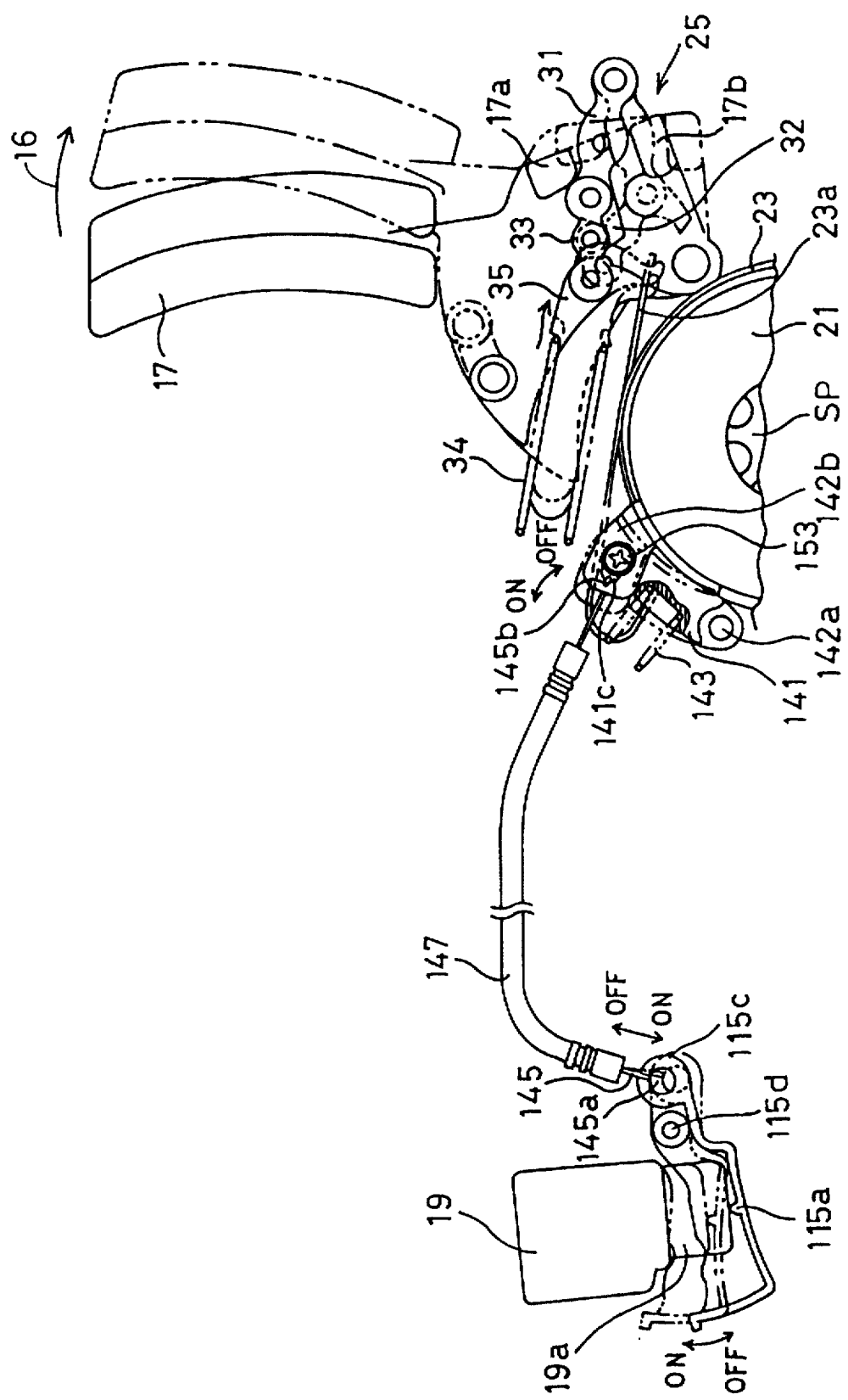
FIG. 6 is an enlarged view of a brake shoe in the chain saw of the second embodiment.

In a chain saw 110 according to the second embodiment, as shown in FIGS. 5 and 6, a mechanical brake device 140 is composed of a brake shoe 141 which can be swung on a support 142a and can be engaged with the periphery of brake drum 21. The mechanical brake device 140 is also composed of a coil spring 143 for urging the brake shoe 141 to engage with the brake drum 21, and a wire 145 connected at one end to a free end 142b of brake shoe 141 and connected at the other end to a forward end 115c of trigger lever 115.

The wire 145 is inserted through a protective tube 147 having both ends securely positioned in a body case 110a. The trigger lever 115 is swingable on a support 115d between a connected end of wire 145 and a trigger contact 115a.

Figure 7A:
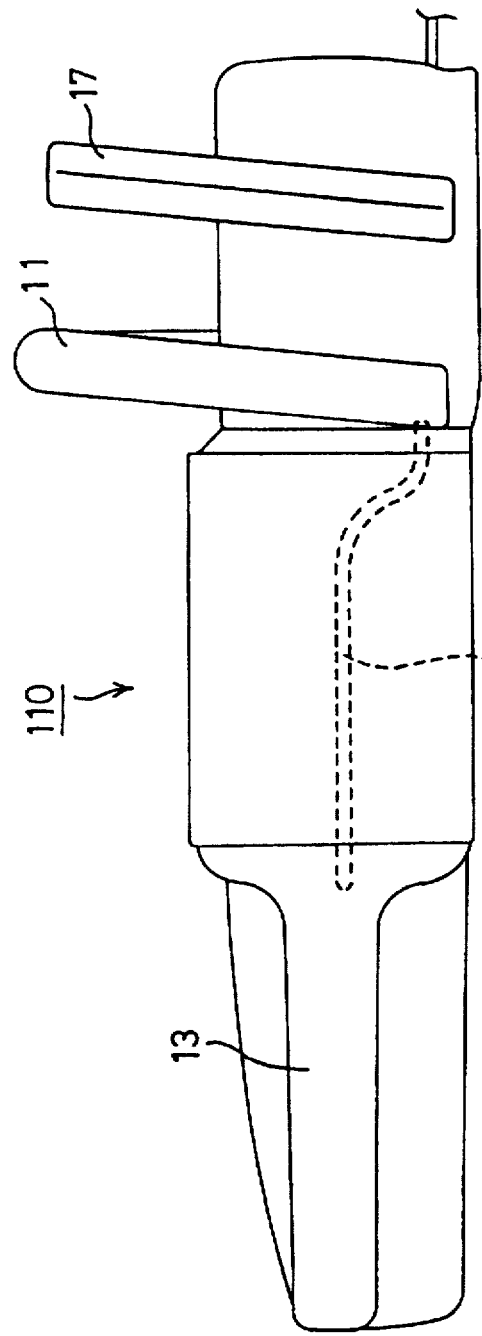
FIG. 7A is a plan view.
Figure 7C:
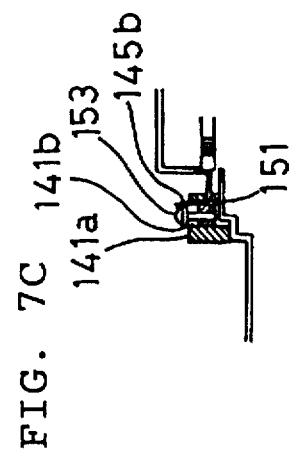
FIG. 7C is a cross-sectional view showing the securing of a wire.
Figure 7D:
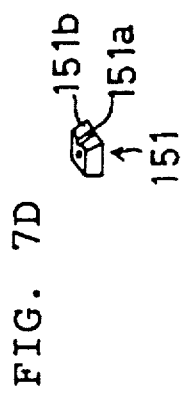
FIG. 7D is a perspective view showing a block member for securing the wire, of the chain saw of the second embodiment.
Figure 7B:
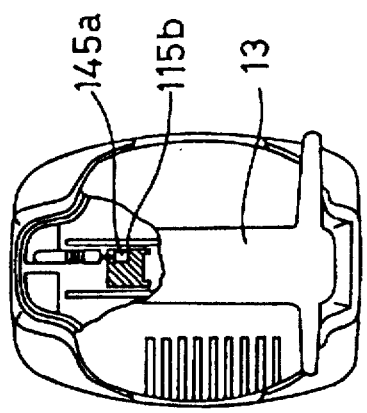
FIG. 7B is a partly broken rear view.

The trigger lever 115 is connected with the wire 145 by engaging a cylindrical block 145a at the end of wire 145 into a hole 115b shown in FIG. 7B in the trigger lever 115, in the same manner as in securing a bicycle brake wire. A forward end 145b of wire 145 is connected with the brake shoe 141, as shown in FIG. 7C, by inserting the forward end 145b in a tapered square hole 141b in a brake shoe body 141a, attaching a block 151 from underneath, and fastening the block 151 with a screw 153 such that the forward end 145b of wire 145 is fastened between the block 151 and the tapered face defining the square hole 141b. An upper part of square hole 141b communicates with an oval groove 141c having a sufficiently small width for preventing the screw 153 from falling off. As shown in FIG. 7D, the block 151 is a specially configured square nut having a slit 151a for receiving the wire 145 in a tapered face 151b.

In operation of mechanical brake device 140, as shown by a solid line in FIG. 6, when the power switch 19 is turned off and the trigger lever 115 is in its OFF position, the wire 145 is loosened, and the brake shoe 141 is pushed by an urging force of coil spring 143 onto the periphery of brake drum 21, thereby applying a braking force such that the chain CH is prevented from rotating.

When the power switch 19 is turned on, as shown by a two-dotted line in FIG. 6, the wire 145 is pulled or tightened while the trigger lever 115 is moved to its ON position, thereby pulling the brake shoe 141 against the urging force of coil spring 143 and permitting the brake drum 21 to rotate. The drive force can be transmitted from the electric motor to the chain CH.

In the chain saw 110 of the second embodiment, by depressing the trigger lever 115 and turning on the power switch 19, the brake drum 21 is permitted to rotate, thereby rotating the chain CH. By letting off the trigger lever 115 and turning off the power switch 19, the brake shoe 141 applies a braking force to the brake drum 21, thereby instantly halting the inertial rotation of chain CH.

As aforementioned, in the second embodiment, by turning off the power switch 19, the brake drum 21 is stopped by a frictional force applied by the brake shoe 141, thereby quickly stopping the chain CH.

The brake shoe 141, operatively connected to the hand guard 17, is provided separately from the brake band 23 of hand guard brake device 20. Therefore, the mechanical brake device 140 operatively connected with the power switch 19 can be added without affecting the conventional structure. The conventional structure can be easily modified in design to incorporate the mechanical brake device 140.

The mechanical brake device 140 operatively connected with the power switch 19 is provided with the components different from those of the mechanical brake device 20 operatively connected with the hand guard 17. The face of the brake band 23 for receiving the frictional force applied when the hand guard 17 is operated is prevented from being worn too quickly.

Furthermore, as shown in FIGS. 5 and 7, the mechanical brake device 140 is formed in a clearance in the vicinity of side walls of the body case 110a using the wire 145, without increasing the size of the chain saw 110.

The brake shoe 141 requires no restoring properties different from the brake band 23. The material of the mechanical brake device 140 is selected just by selecting a friction coefficient and consideration of durability. When the brake shoe 141 is pushed against the periphery of brake drum 21 for braking, the power switch 19 is turned off and no strong drive force is applied to the brake drum 21. Accordingly, the material of the brake shoe 141 is chosen to have a sufficiently large friction coefficient. The braking capabilities of mechanical brake device 140 can be optionally designed.

In the same manner as in the first embodiment, when the trigger lever 115 is released, the mechanical brake device 140 and the brake circuit 62 are operated concurrently. While a braking force is mechanically applied to the brake drum 21, the inertial rotary force of the electric motor is diminished by dynamic braking, quickly decreasing the number of rotations of the electric motor and releasing the centrifugal clutch. When the trigger lever 15 is released, no rotary drive force is transmitted to the brake drum 21. Therefore, without exerting excessive force to the brake shoe 141, the chain CH can be quickly stopped. The durability of brake drum 21, brake shoe 141 and chain CH can be enhanced.

A third embodiment is now explained referring to FIGS. 8–12. The third embodiment is the same as the first embodiment in that the electric drive and brake device 60 for dynamic braking as shown in FIG. 4, and the hand guard brake device 20 operatively connected to the hand guard 17 are provided. The components having the same reference numerals as those of the components of the first embodiment are not explained hereinafter. The aspects of the third embodiment different from the first embodiment, the clutch mechanism, the mechanical brake device operated when the trigger lever is released and the circuit structure of the electric drive and brake device, are explained.

In an electromotive chain saw 560 according to the third embodiment shown in FIG. 8, a trigger-linked mechanical brake 570 is driven with a linkage when a trigger member 585 is released, thereby disconnecting a clutch 590 and stopping the brake drum 521. The hand gaurd brake device, operated by turning the hand guard 17 in the direction shown by the arrow 16, is identical to the corresponding device of the first embodiment.

As shown in FIGS. 10A–C and 11A–B, the trigger-linked mechanical brake 570 is composed of a brake shoe 571, a metal support fitting 573 having a shape similar to that of a tennis racket for supporting the brake shoe 571, a swingable lever 575 connected with a pin 578b to an arm 573a of metal support fitting 573, and a clutch 590 turned on or off with a frame 573b of metal support fitting 573.

As shown in FIG. 10C, the frame 573b of metal support fitting 573 is partly bent into an M-shaped part 573c. The formed M-shaped part 573c is in contact with the top of a swingable detent 577 secured, as seen in FIG. 11A, with a rivet 576b to a block 576a in a housing. The swingable detent 577 is normally urged by a spring 577a clockwise as seen in the figure. As shown in FIG. 11A, the frame 573b is restricted in its movement, or guided, by a screw 578a securely inserted in a long hole 573d formed in the frame 573b.

As shown in FIG. 11A, the metal support fitting 573 and the swingable lever 575 are interconnected with a pin 578b engaged in a longitudinal hole 575a. When the swingable lever 575 is moved, the metal support fitting 573 can be slid smoothly.

A brake shoe 571 is fixedly supported on an arm 573e raised on the root surface of arm 573a of metal support fitting 573, and urged or pushed against an inner periphery of brake drum 521 by a coil spring 579 housed in a case 576c formed adjacent the raised arm 573e.

A free end 575b of swingable lever 575 is connected with a pin 578c to one end 580a of a link rod 580. The other end 580b of link rod 580 is connected with a pin 578d to the tip of an arm 585a of trigger member 585.

As shown in FIGS. 8 and 11A, the trigger member 585 is rotated about a support 585c at the forward end of a tab 585b which can be manually depressed. The support 585c is interposed between the tab 585b and the arm 585a, as shown in FIG. 11A. When the trigger member 585 is depressed, the arm 585a is rotated clockwise about the support 585c, thereby pushing the link rod 580 forward as shown by a two-dotted line in FIG. 11A. When the trigger member 585 is released, the trigger member 585 is rotated counterclockwise by the urging force of pushing button 613 of power switch SW1 and the urging force of the coil spring 579 behind the brake shoe 571, thereby returning the link rod 580 to the initial position, as shown by a solid line in FIG. 11A.

When the trigger member 585 is depressed, a compression load is applied to the link rod 580. Therefore, the link rod 580, formed by pressing a metal plate, is bulged in its middle so as to have an improved buckling strength.

As shown in FIGS. 10A and 10B, the clutch 590 is composed of a male clutch member 593 formed integral with and rotatable about a rotation shaft 591 and slidable in an axial direction, a female clutch member 595 provided on the brake drum 521, and a coil spring 597 for urging the male clutch member 593 toward the female clutch member 595. One pair of axial grooves 591a are spaced apart at an angle of 90 degrees from the other pair of grooves 591a, about the rotation shaft 591. Grooves 593a are formed in the male clutch member 593, corresponding to the grooves 591a. The male clutch member 593 is fixedly attached to the rotation shaft 591 via steel balls 592 received between the grooves 591a and 593a, such that the male clutch member 593 is integral with the rotation shaft 591 about the rotation axis and is also slidable in the axial direction. The male clutch member 593 is provided with a jaw 593b having an outer diameter of sufficient size to contact the swingable detent 577. When the swingable detent 577 is depressed by the M-shaped part 573c, the jaw 593b is also depressed, thereby releasing the clutch 590.

The operation of trigger-linked mechanical brake 570 is now explained referring to FIGS. 10 and 11.

When the trigger member 585 is released, the link rod 580 and the swingable lever 575 are in the position shown by a solid line in FIG. 11A. The M-shaped part 573c is lowered to depress the swingable detent 577 as shown in the upper figure of FIG. 10C. In the clutch 590, as shown in FIG. 10B, the male and female clutch members 593 and 595 are disconnected from each other, and no rotary force is transmitted from the rotation shaft 591 to the brake drum 521 and the sprocket SP. In addition, the brake shoe 571 is moved to the position shown by a solid line in FIG. 11A such that the brake shoe 571 is urged by the coil spring 579, thereby stopping the brake drum 521 and the sprocket SP. Therefore, when the trigger member 585 is released, the clutch 590 is immediately released, and the brake force is applied by the brake shoe 571, thereby instantly stopping the chain CH.

When the trigger member 585 is depressed, the link rod 580 and the swingable lever 575 are moved to the position shown by a two-dotted line in FIG. 11A. The M-shaped part 573c applies no depressing force to the swingable detent 577 as shown in the lower figure of FIG. 10C. The swingable detent 577 is rotated clockwise as seen in FIG. 10C by the urging force of the coil spring 597 via the jaw 593b of male clutch member 593 and by the urging force of spring 577a. In the clutch 590, as shown in FIG. 10A, the male and female clutch members 593 and 595 are engaged with each other. The brake shoe 571 is returned to the position shown by the two-dotted line in FIG. 11A, in which the coil spring 579 is compressed. No brake force is applied to the brake drum 521 and the sprocket SP any longer. Therefore, when the trigger member 585 is depressed, the clutch 590 is immediately engaged and no brake force is applied by the brake shoe 571. Drive force is instantly transmitted from the motor M to the sprocket SP, thereby rotating the chain CH.

Figure 12:
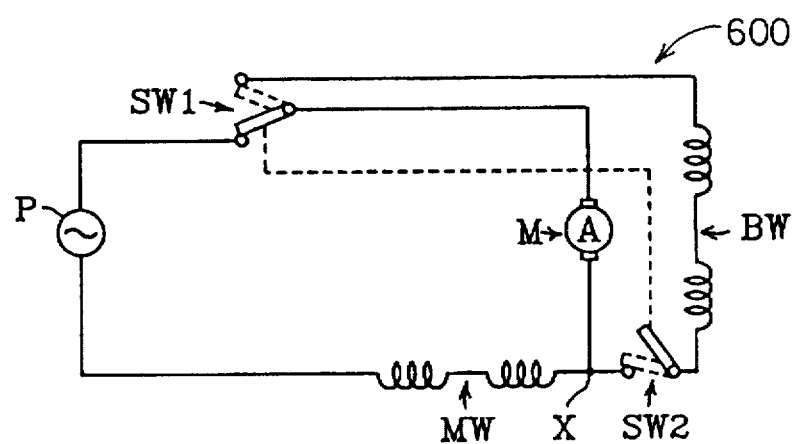
FIG. 12 is a circuit diagram of an electric brake device in the chain saw of the third embodiment.

An electric drive and brake device 600 according to the third embodiment includes, as shown in FIG. 12, a brake circuit of a single-phase series commutator motor. In the electric drive and brake device, a main winding MW for driving an armature M and a brake winding BW for braking the armature M are provided in the same field slot. The armature M is driven or braked by changing over the connection of the armature M with the main winding MW and the brake winding BW via a single-pole double-throw switch SW1. In the electric drive and brake device 600 a single pole switch SW2 is provided between a common contact X of main winding MW relative to armature M and the brake winding BW. When the armature M is driven, the single pole switch SW2 and the single-pole double-throw switch SW1 are switched over as shown by a solid line in FIG. 12. When the armature M is braked, the single pole switch SW2 and the single-pole double-throw switch SW1 are switched over as shown by a dotted line in FIG. 12.

As shown in FIGS. 8 and 11A, the single-pole double-throw switch SW1 and the single pole switch SW2 are housed in the rearward handle 13 of the chain saw.

As shown in FIG. 11A, the single-pole double-throw switch SW1 is a switch block provided with three contacts A, B and C in a housing 611. When a push button 613 is projected from the housing 611, the contact A is connected to the contact C, and when the push button 613 is depressed into the housing 611, the contact B is connected to the contact C. Also as shown in FIGS. 11A and 11B, the single pole switch SW2 is a switch block provided with two contacts P and Q in a housing 621. When a push button 623 is projected from the housing 621, the contact P is connected to the contact Q, and when the push button 623 is depressed into the housing 621, the contact P is disconnected from the contact Q. The push buttons 613 and 623 are normally urged by a not-shown spring in the housings 611 and 621 to project from the housings 611 and 621, respectively.

The trigger member 585 is provided in the rearward handle 13 such that the trigger member 585 can contact the push buttons 613, 623, respectively. When the trigger member 585 is depressed in the rearward handle 13, both the push buttons 613, 623 are depressed in the housings 611, 621, respectively. When the trigger member 585 is released, the push buttons 613 and 623 are projected from the housing 511 and 521, respectively.

In the third embodiment, when the trigger member 585 is depressed, the contact P is first disconnected from the contact Q in the single pole switch SW2. Subsequently, in the single-pole double-throw switch SW1, the contact A is disconnected from the contact C and the contact B is connected to the contact C. When the trigger member 585 is released, first in the single-pole double-throw switch SW1, the contact B is disconnected from the contact C, and the contact A is connected to the contact C. Subsequently, in the single pole switch SW2, the contact P is connected to the contact Q.

In the third embodiment, when the trigger member 585 is depressed, after the male and female clutch members 593 and 595 are engaged with each other, the single-pole double-throw switch SW1 is changed over to the closed circuit connecting the electric power and the electric motor, thereby driving the electric motor. When the depressed trigger member 585 is released, the single-pole double-throw switch SW1 is changed over to the open circuit for disconnecting the electric power from the electric motor, thereby placing the electric motor in the inoperative condition. Subsequently, the male and female clutch members 593 and 595 are disengaged from each other. Therefore, while the electric motor is driven, no engagement or disengagement of the clutch members are performed, thereby enhancing the durability of the clutch detent members.

In the third embodiment, when the trigger member 585 is released, the clutch 590 is disconnected, and a mechanical braking force is applied by the brake shoe to the brake drum. Therefore, without loading much frictional force on the brake shoe, the chain can be stopped quickly. Also, the electric drive and brake device for dynamic braking is operated, thereby instantly stopping the inertial rotation of the electric motor. In the third embodiment, since the clutch 590 is forceably disconnected, the brake drum is not braked by the electric brake circuit and the electric motor itself is dynamically braked. However, the operator can recognize the chain as well as the motor instantly stopping, and can operate the chain saw comfortably. The clutch is mechanically disconnected before the electric motor is stopped. Therefore, only the inertial rotation of the electric motor is stopped through dynamic braking, and the period of time required for stopping the electric motor can be advantageously reduced. It can be appreciated that the third embodiment provides a function of stopping the electric motor quickly.

If, after disconnecting the clutch, no electric drive and brake device is operated, the electric motor will be inertially rotated for several seconds, without any load of the chain put thereon. If the trigger member is again depressed during such inertial rotation, the inertially rotating male clutch member 593 will be engaged with the mechanically stopped female clutch member 595. The drive force of the electric motor acting on the engagement of the clutch members will deteriorate the durability of the clutch members 593, 595.

In the third embodiment, however, the chain is instantly stopped by the trigger-linked mechanical brake and concurrently the electric motor is instantly stopped by the electric brake circuit 600. If the chain saw is again driven immediately after stopped, the male and female clutch members 593 and 595 are engaged with each other while the electric motor is stopped. No drive force of the electric motor acts on the clutch engagement and the durability of the clutch members 593, 595 is prevented from impairment. Since, in the actual operation of the chain saw, the trigger member 585 may be repeatedly turned on and off, the aforementioned advantage of the enhanced durability is remarkably effective in the electromotive chain saw provided with the trigger-linked mechanical brake having the aforementioned clutch disconnecting mechanism.

In the third embodiment the inner and outer peripheries of the brake drum are in contact with the brake device 570 operable when the trigger member is released and the hand guard brake device 20 operatively connected with the hand guard 17, respectively. These brake devices can be provided without increasing the size of the brake drum 521 or the entire size of the chain saw. These brake mechanisms can coexist in a compact structure.

In the third embodiment, by providing the M-shaped part 573c, as the clutch first begins to be released, and after the clutch is released, the braking force is applied. The time the clutch is released deviates from the time the braking force is applied. Therefore, a braking force can be easily applied. In the embodiment, the clutch is released and the brake device 570 is operated, using the action of a lever. The trigger member 585 can be depressed without requiring a strong depression force, thereby giving an operator comfort.

In a modified electric drive and brake device or circuit 600, during the operation of the chain saw, the brake winding BW can be disconnected from the main winding MW and the armature M via the single pole switch SW2. In this case, since the main winding MW and the brake winding BW, provided in the same field slot, are disconnected from each other via the single pole switch SW2, the windings fail to be deteriorated and no field layer shortage occurs. Therefore, to provide sufficient braking capabilities of brake winding BW, the number of windings of brake winding BW can be increased. The modified brake circuit can form a highly durable, highly capable brake device. Furthermore, the modified brake circuit can be inexpensively formed by adding an inexpensive single-pole switch to the brake circuit of the first embodiment, obviating the necessity of a two-pole double-throw switch.

Figure 13:
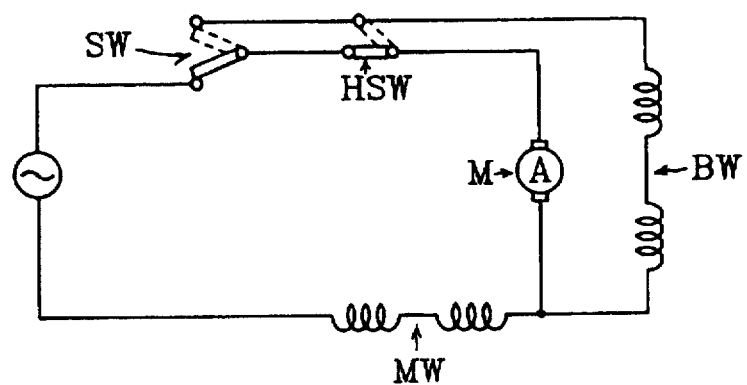
FIG. 13 is a circuit diagram of an electric brake device in a chain saw according to a modification.

A further modified brake circuit, as shown in FIG. 13, can be formed from the circuit shown in FIG. 4. A single-pole double-throw switch HSW, closed when the hand guard 17 is operated, is provided between the single-pole double-throw switch SW1 and the armature M. In the circuit, when the hand guard brake device 20 is operatively connected with the hand guard 17, the switch HSW is turned as shown by a dotted line in FIG. 13, for dynamic braking. When either switch SW1 or HSW is activated, the brake winding BW is changed over for dynamic braking.

The electric drive and brake device 600 of the third embodiment can be used in the first and second embodiments.

In the third embodiment, the single pole switch SW2 is turned on or off by the arm 585a of trigger member 585. The single pole switch SW2 can be positioned such that the switch SW2 can be turned on or off by moving the link rod 580 provided with a projection.

This invention has been described above with reference to the preferred embodiments as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. An electromotive chain saw comprising;
   a guide bar having a track extending around a periphery thereof;
   a cutting chain being supported by said track of said guide bar and being rotatable therearound;
   an electric motor, having an armature, being drivingly-connected to said cutting chain, via a drive mechanism, to rotate said cutting chain about the periphery of said bar along said track, and said drive mechanism including a brake drum drivingly connected to said cutting chain for rotation with said cutting chain;

a mechanical brake being arranged to engage with said brake drum, said mechanical brake having a disengaged position in which said mechanical brake is disengaged from said brake drum and permits rotation thereof, and said mechanical brake having an engaged position in which said mechanical brake engages with said brake drum and exerts a braking force on a surface of said brake drum to stop the rotation of thereof and, in turn, stop rotation of said cutting chain rotated thereby;

a dynamic brake circuit being electrically coupled to said armature of said electric motor to supply power thereto and rotate said cutting chain, in an operation position of said dynamic brake circuit, and said dynamic brake circuit having a braking position in which said dynamic brake circuit applies a braking force to said armature of said electric motor to stop rotation thereof; and a common trigger member being directly linked to both said dynamic brake circuit and said mechanical brake such that actuation of said common trigger member to an ON position concurrently actuates both said mechanical brake to said disengaged position and said dynamic brake circuit to said operation position while actuation of said common trigger member to an OFF position concurrently actuates both said mechanical brake to said engaged position and said dynamic brake circuit to said braking position whereby both said dynamic brake force on said armature of said electric motor and said braking force on said brake drum are concurrently applied.

2. The electromotive chain saw according to claim 1, further including a hand brake device comprising a hand guard, a linkage and a steel brake band, said linkage connects a forward end of said brake band to said hand guard, said brake band is wound around a circumference of said brake drum, and said hand brake device is operated by pushing said hand guard away from an operator such that a spring is extended thereby pulling an end of said brake band to tighten said brake band and exert a braking force opposite in direction to the braking force exerted by said mechanical brake resulting in extended life for said brake band.

3. The electromotive chain saw according to claim 1, wherein said a bent rod couples said common trigger member to said mechanical brake.

4. The electromotive chain saw according to claim 3, wherein said mechanical brake is located in a clearance of a chain saw case using said bent rod without increasing the size of said chain saw.

5. The electromotive chain saw according to claim 1, wherein a rotary drive force is supplied to a drive sprocket from said electric motor via a centrifugal clutch mechanism when a rotational speed of said electric motor exceeds a predetermined number of rotations, and said rotary drive force disconnects said drive sprocket from said electric motor via said centrifugal clutch mechanism when the rotational speed of said electric motor is lower than said predetermined number of rotations.

6. The electromotive chain saw according to claim 1, wherein rotary drive force is transmitted from said electric motor to a drive sprocket via a clutch mechanism;

said clutch mechanism comprises an engagement member formed on said brake drum, an engaging member rotated by said electric motor rotating with a rotation shaft, said engaging member is slidable in an axial direction on said rotation shaft and engages with said engagement member on said brake drum;

an urging member for pushing and urging said engaging member against said brake drum; and a clutch release member which releases the engagement of said engaging member on said brake drum by sliding said engaging member back against said urging member when said trigger member is moved from said ON position to said OFF position.

7. The electromotive chain saw according to claim 1, wherein said mechanical brake comprises a movable member operatively connected to said common trigger member and secured to a second end of a brake band, which extends around a circumference of said brake drum, such that said brake band is pulled and tightened around said brake drum when said trigger member is in said OFF position, and said brake band is released and loosened from said brake drum when said trigger member is in said ON position.

8. The electromotive chain saw according to claim 1, wherein said mechanical brake is provided with a brake shoe for engaging with an outer periphery of said brake drum.

9. The electromotive chain saw according to claim 2, in which said mechanical brake is provided with a brake shoe for engaging with an inner periphery of said brake drum.

10. The electromotive chain saw according to claim 9, wherein when said common trigger member is in said OFF position, said brake shoe contacts said brake drum to apply said braking force to said brake drum and when said common trigger member is in said ON position, said brake shoe is removed from contact with said brake drum thereby removing said braking force from said brake drum.

11. The electromotive chain saw according to claim 1, further comprising a trigger link brake circuit having:

a main winding and a brake winding provided in a field slot;

a single-pole double-throw switch for driving and braking said electric motor, used to change between supplying a drive current to said armature and said main winding and supplying a counter electromotive force arising on said brake winding; and a single pole switch for disconnecting said brake winding from said main winding when said single-pole double-throw switch is changed over to supplying the drive current to said armature and said main winding.

12. The electromotive chain saw according to claim 11, wherein said electric motor, provided with said trigger link brake circuit, comprises a single-phase series commutator motor, when driving said electromotive chain saw, said single pole switch is changed over to open the connection of said brake winding with said armature and said main winding, a clutch mechanism is engaged, and said single-pole double-throw switch is changed over to connect a power source with said armature and said main winding, and when braking said electromotive chain saw, said single-pole double-throw switch is changed over to open the connection of the power source with said armature and said main winding and to connect said brake winding with said armature, said clutch mechanism is disengaged, and said single pole switch is changed over to connect said brake winding with said armature.

13. The electromotive chain saw according to claim 12, wherein when driving said electromotive chain saw, after said single pole switch is changed over to open the connection of said brake winding with said armature and said main winding, said clutch mechanism is engaged and subsequently said single-pole double-throw switch is changed over to connect a power source with said armature and said main winding, and when braking said electromotive chain saw, after said single-pole double-throw switch is changed over to open the connection of the power source with said armature and said main winding and concurrently to connect said brake winding with said armature, said clutch mechanism is disengaged, and subsequently said single pole switch is changed over to connect said brake winding with said armature.

14. The electromotive chain saw according to claim 1, wherein said brake mechanism is a steel brake band wound around a circumference of said brake drum, when said trigger member is in said OFF position said steel brake band is tightened resulting in application of said braking force to said brake drum, and when said trigger member is in said ON position said steel brake band is loosened from said brake drum thereby removing said braking force from said brake drum.

* * * * *